United States Patent [19]

Ahn

[11] Patent Number: 5,773,930
[45] Date of Patent: Jun. 30, 1998

[54] DISPLAY DEVICE FOR CONTROLLING LIGHT INTENSITY

[75] Inventor: Se-Jin Ahn, Kwangmyung, Rep. of Korea

[73] Assignee: Samsung Electronics Co., Ltd., Kyungki-do, Rep. of Korea

[21] Appl. No.: 626,928

[22] Filed: Apr. 3, 1996

[30] Foreign Application Priority Data

Dec. 15, 1995 [KR] Rep. of Korea ................. 1995-50701

[51] Int. Cl.$^6$ ..................................................... H01J 1/70
[52] U.S. Cl. ...................... 313/506; 313/503; 313/505; 313/509
[58] Field of Search ........................... 313/506, 503, 313/505, 509, 512; 315/169.3

[56] References Cited

U.S. PATENT DOCUMENTS

| | | | |
|---|---|---|---|
| 3,248,588 | 4/1966 | Blazek et al. | 313/509 |
| 4,877,968 | 10/1989 | Miwa | 313/509 |
| 4,882,517 | 11/1989 | Maruyama et al. | 313/509 X |
| 5,589,733 | 12/1996 | Noda et al. | 313/509 |
| 5,598,058 | 1/1997 | LaPointe | 313/509 X |

*Primary Examiner*—Ashok Patel
*Attorney, Agent, or Firm*—Sughrue, Mion, Zinn, Macpeak & Seas, PLLC

[57] ABSTRACT

A display device for controlling light intensity is provided. The display device has a pair of glass substrates disposed in parallel so as to face each other, and first and second transparent electrodes each arranged as stripes on the inner surfaces of the glass substrates, respectively, and extend orthogonally to each other and to which voltages are applied. A dielectric layer is disposed between the first transparent electrode and the second transparent electrode. The intensity of light transmitting the display device is controlled by controlling the density of electrons charged in part of at least one of the first and second transparent electrodes according to the applied voltage and thus reflecting light incident on the electrodes in which the electrons are charged.

3 Claims, 2 Drawing Sheets

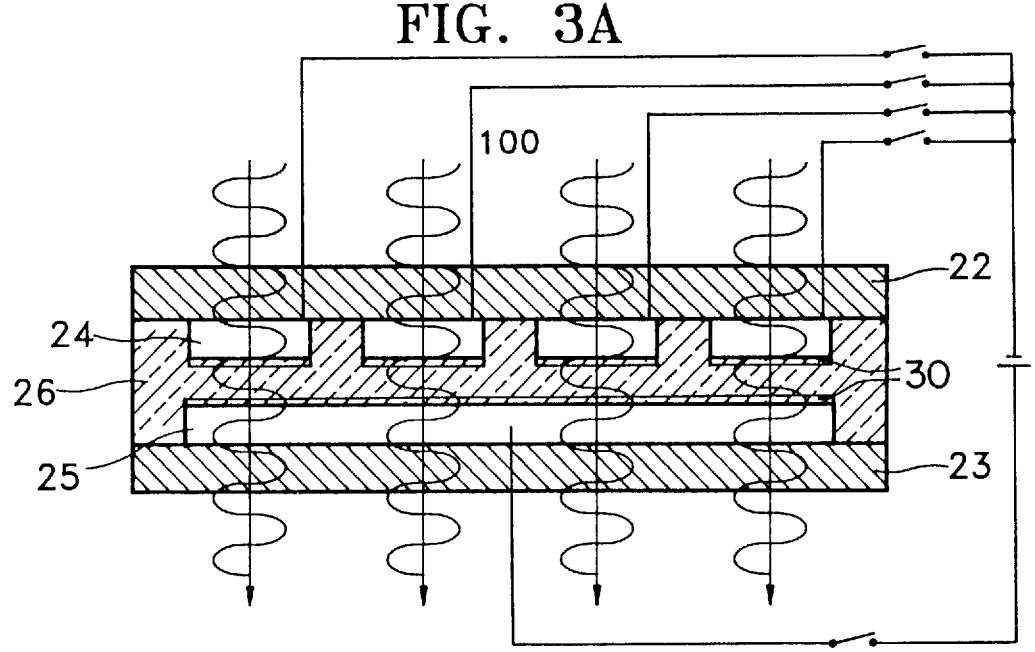
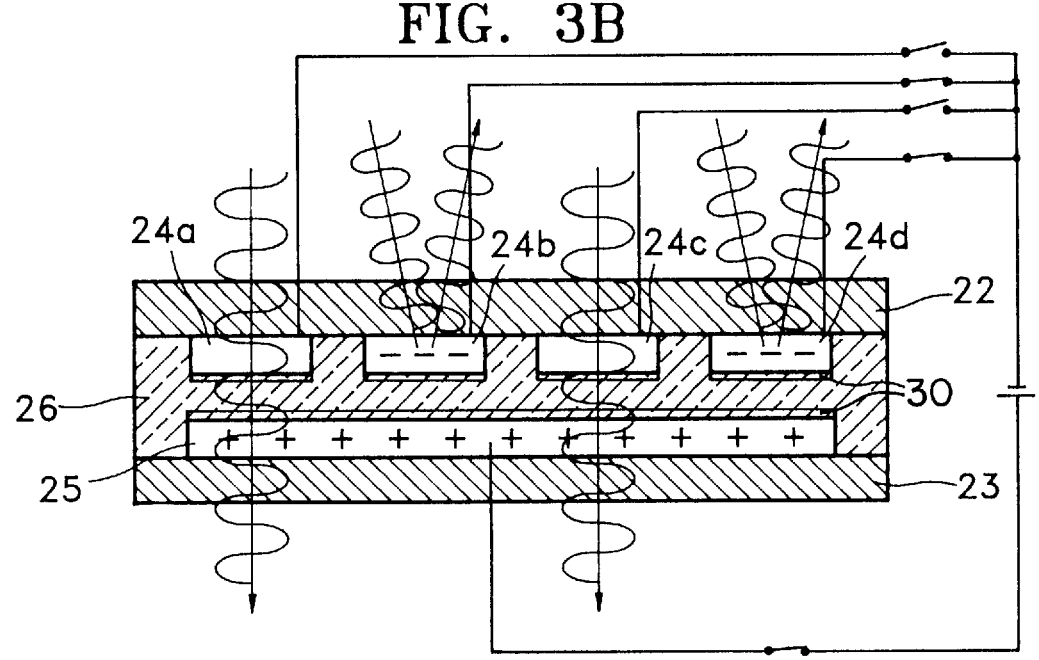

DISPLAY DEVICE FOR CONTROLLING LIGHT INTENSITY

BACKGROUND OF THE INVENTION

The present invention relates to a display device for controlling light intensity and, more particularly, to a display device for controlling the intensity of incident light by adjusting electron density.

Liquid crystal displays exhibit distinct advantages over displays achieved by a cathode ray tube, in that the screen of a liquid crystal display can be made large, thin and lightweight, and the desired flatness and rectangular shape of the screen can easily be attained. Besides, the relatively low power consumption of the liquid crystal display enables the widespread application in display devices.

FIG. 1 illustrates a conventional liquid crystal display.

In FIG. 1, a pair of polarizing plates 10 and 11 are disposed in parallel so as to face each other. A first glass substrate 12 and a second glass substrate 13 are arranged between the polarizing plates 10 and 11, with an electrode 14 of the first glass substrate 12 being orthogonal to an electrode 15 of the second glass substrate 13. Here, indium tin oxide (ITO) transparent electrodes are usually used as the electrodes 14 and 15. Liquid crystal orientation films 16 and 17 are formed on the glass substrates 12 and 13 having the electrodes 14 and 15 thereon, respectively, each film having a controlling surface for orienting liquid crystal molecules. The orientation films 16 and 17 are obtained by coating the surfaces of the glass substrates 12 and 13 having electrodes 14 and 15 with a high molecular weight material or an inorganic material, and rubbing the coating with a rubbing roller (not shown) in a predetermined direction. Alternatively, the orientation films 16, and 17 may be constituted by depositing silicon oxide on the surfaces of the glass substrates 12 and 13. Then, a liquid crystal layer 18 is injected into the space between the orientation films 16 and 17, and the device is sealed with spacers 19.

When incident light 100 is projected through the liquid crystal display device as constituted above, the light 100 is polarized by the upper polarizing plate 10. The polarized light reaches the liquid crystal layer 18 through the first glass substrate 12. At this stage, since the arrangement of the molecules of the liquid crystal layer 18 is a downward spiral, when a voltage is not applied to the electrodes 14 and 15, the light travelling along the arranged molecules is blocked by the lower polarizing plate 11. On the other hand, when a predetermined voltage is applied to the electrodes 14 and 15, the molecules of the liquid crystal layer 18 are aligned, thereby enabling the incident light to penetrate the polarizing plate 11 through the liquid crystal molecules.

The intensity of the light passing through or transmitting through the lower polarizing plate 11 depends on the voltage applied to the electrodes 14 and 15 and a spiral angle of the liquid crystal molecules which is determined by the kind of liquid crystal being employed. However, since light emitted from a conventional lamp (not shown) (used as a light source) and incident to the liquid crystal display device is not polarized itself, the intensity of light transmitted from the polarizing plate 10 through the polarizing plate 11 via the liquid crystal layer 18 is very small. As a result, the liquid crystal display device cannot accomplish a desired luminance.

Further, a manufacturing process of the liquid crystal display device is very complicated, and the inherent liquid state of the liquid crystal layer 18 renders its handling difficult.

SUMMARY OF THE INVENTION

It is an object of the present invention to provide a display device for controlling light intensity, in which a solid dielectric material is used, without polarizing plates, to facilitate a manufacturing process thereof.

It is another object of the present invention to provide a display device for controlling light intensity by controlling electron density according to a voltage applied to an electrode.

To achieve the above objects, there is provided a display device for controlling light intensity, comprising: a pair of glass substrates disposed in parallel so as to face each other, the glass substrates each having an inner surface; first and second transparent electrodes each arranged as stripes on the inner surfaces of the glass substrates, respectively, and to which voltages are applied, the first and second transparent electrodes extend orthogonally to each other and lie in parallel planes; and a dielectric layer disposed between the first transparent electrode and the second transparent electrode, wherein the intensity of light transmitting through the display device is controlled by controlling the density of electrons charged in part of at least one by the first and second transparent electrodes according to the applied voltage and thus reflecting light incident on the at least one of the first and second transparent electrodes in which the electrons are charged.

Preferably, the transparent electrodes are made of indium tin oxide, and the dielectric layer is made of at least PZT (i.e., a compound of PbO, $ZrO_2$ and $TiO_2$), PLZT (i.e., a compound of PbO, $ZrO_2$, $TiO_2$ and $La_2O_3$), a barium compound, and a titanium compound.

BRIEF DESCRIPTION OF THE DRAWINGS

The objects and advantages of the present invention will become more apparent by describing in detail a preferred embodiment thereof with reference to the accompanying drawings, in which:

FIGS. 3A and 3B illustrate the state of the display device in FIG. 2 when voltage is not applied and the state thereof when voltage is applied, respectively.

DETAILED DESCRIPTION OF THE PREFERRED EMBODIMENT

Figure 1:
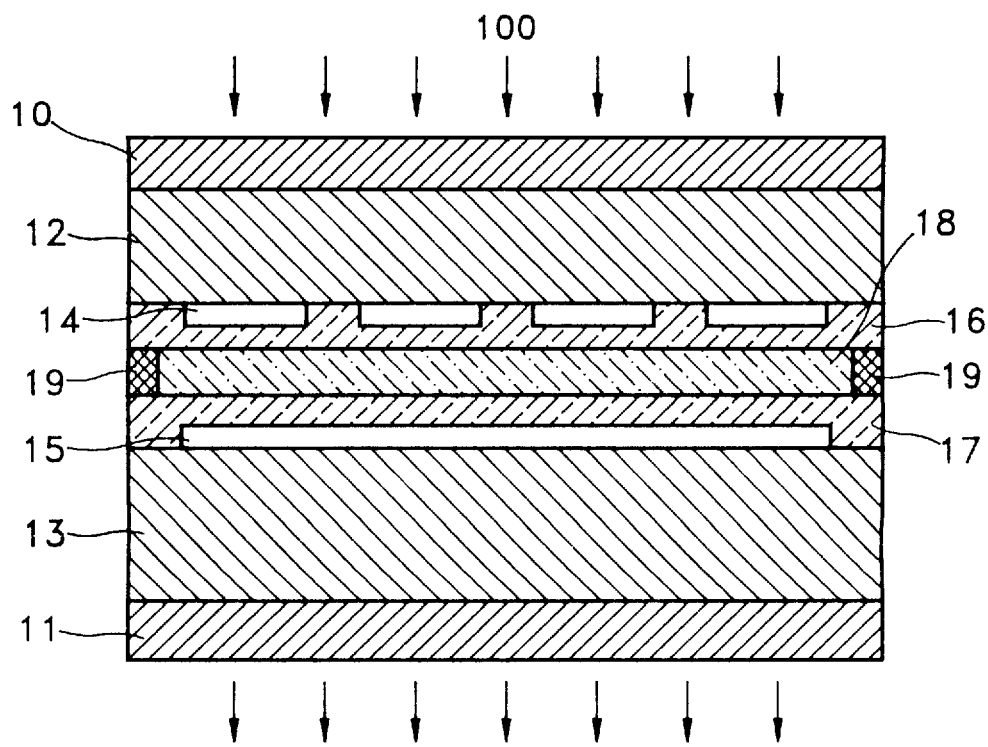
FIG. 1 is a sectional view of a conventional liquid crystal display.
Figure 2:
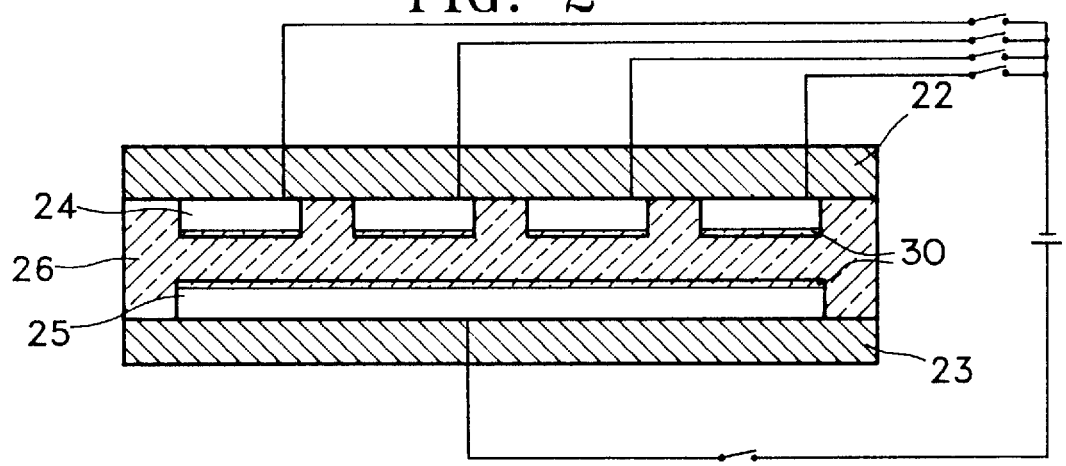
FIG. 2 is a sectional view of a display device for controlling light intensity.

Referring to FIG. 2, a display device for controlling light intensity according to the present invention includes a pair of glass substrates 22 and 23 disposed in parallel so as to face each other. Striped transparent electrodes 24 and 25 are formed on the inner surfaces of the glass substrates 22 and 23, respectively, so that the electrodes 24 are disposed on the plane of the inner surface of substrate 22 and the electrodes 25 are disposed on the parallel plane of the inner surface of substrate 23. The electrodes 24 extend orthogonally to the electrodes 25 as in the conventional liquid crystal display.

Preferably, the transparent electrodes 24 and 25 are made of ITO material and formed on the glass substrates 22 and 23 by deposition or sputtering.

A dielectric layer 26 is disposed between the electrodes 24 and 25 by deposition or sputtering. The dielectric layer 26 is made of a ferroelectric material having an excellent capacity for storing electrons and is preferably a compound of PbO, $ZrO_2$ and $TiO_2$ (PZT) or of PbO, $ZrO_2$, $TiO_2$ and $La_2O_3$ (PLZT). In this case, a barium compound or a titanium compound may be used to form the dielectric layer 26.

FIG. 3A shows the state of the display device shown in FIG. 2 when a voltage is not applied to the electrodes 24 and 25. When light is incident on the display device for controlling light intensity, the light is transmitted to the opposite side through the glass substrates 22 and 23, the transparent electrodes 24 and 25 and the dielectric layer 26.

FIG. 3B shows the state of the display device shown in FIG. 2 when a voltage is selectively applied to the transparent electrodes 24 and 25. In this case, voltage is applied to the electrodes 24b and 24d but is not applied to the electrodes 24a and 24c. Light incident on the electrodes 24a and 24c, to which voltage is not applied, is transmitted to the opposite side through the glass substrates 22 and 23, the electrodes 24 and 25 and the dielectric layer 26.

However, the electrodes 24b and 24d to which voltage is applied are negatively charged with electrons. The charge density of electrons can be adjusted according to the voltage applied to the transparent electrodes 24b and 24d. As the electron density of the transparent electrodes 24b and 24d increases gradually, the electrons take on the same characteristics as free electrons in metal, thereby reflecting light from the electrodes 24b and 24d in the same manner as in a metal surface. Since the luminance of light finally transmitting the display device for controlling light intensity depends on the intensity of light reflected from and transmitting the electrodes, light intensity is controlled by adjusting the density of electrons charged in the electrodes through the control of applied voltage.

Therefore, an intended picture is displayed by selectively applying voltage to transparent electrodes. In this case, it is desirable to form a reflection-free coating on the upper surface of the transparent electrodes which light transmits, to increase the intensity of the transmitted light.

The present invention is not restricted to the above embodiment, and it is clearly understood that many variations are possible within the spirit and scope of the present invention by those skilled in the art.

What is claimed is:

1. A display device for controlling light intensity, comprising:

a pair of glass substrates disposed in parallel so as to face each other, said glass substrates each having an inner surface;

first and second transparent electrodes each arranged as stripes on the inner surfaces of said glass substrates, respectively, and to which voltages are applied, said first and second transparent electrodes extend orthogonally to each other and lie in parallel planes;

a dielectric layer disposed between said first transparent electrode and said second transparent electrode; and wherein at least one of said first and second transparent electrodes is operative to receive an applied voltage which, in part, charges a density of electrons such that the electrons are controlled and result in control of an intensity of light transmitted through said display device, thus reflecting light incident on said at least one of said first and second transparent electrodes in which the electrons are charged; and wherein said dielectric layer is made of a barium compound and a titanium compound.

2. A display device for controlling light intensity, comprising:

a pair of glass substrates disposed in parallel so as to face each other, said glass substrates each having an inner surface;

first and second transparent electrodes each arranged as stripes on the inner surfaces of said glass substrates, respectively, and to which voltages are applied, said first and second transparent electrodes extend orthogonally to each other and lie in parallel planes;

a dielectric layer disposed between said first transparent electrode and said second transparent electrode; and wherein at least one of said first and second transparent electrodes is operative to receive an applied voltage which, in part, charges a density of electrons such that the electrons are controlled and result in control of an intensity of light transmitted through said display device, thus reflecting light incident on said at least one of said first and second transparent electrodes in which the electrons are charged; and wherein said dielectric layer is made of a material selected from the group consisting of PZT and PLZT.

3. A display device for controlling light intensity, comprising:

a pair of glass substrates disposed in parallel so as to face each other, said glass substrates each having an inner surface;

first and second transparent electrodes each arranged as stripes on the inner surfaces of said glass substrates, respectively, and to which voltages are applied, said first and second transparent electrodes extend orthogonally to each other and lie in parallel planes;

a dielectric layer disposed between said first transparent electrode and said second transparent electrode; and wherein at least one of said first and second transparent electrodes is operative to receive an applied voltage which, in part, charges a density of electrons such that the electrons are controlled and result in control of an intensity of light transmitted through said display device, thus reflecting light incident on said at least one of said first and second transparent electrodes in which the electrons are charged; and wherein upper surfaces of said at least one of said first and second transparent electrodes in which the electrons are charged are coated with a reflection-free coating.

* * * * *